Feb. 13, 1951 D. B. ROBISON 2,541,668

SELECTIVE SIGNALING SYSTEM

Filed Nov. 16, 1946

INVENTOR:
DANIEL B. ROBISON
BY C. P. Soper
ATTORNEY

Patented Feb. 13, 1951

2,541,668

UNITED STATES PATENT OFFICE 2,541,668

SELECTIVE SIGNALING SYSTEM

Daniel B. Robison, Villa Park, Ill., assignor to Kellogg Switchboard and Supply Company, Chicago, Ill., a corporation of Illinois Application November 16, 1946, Serial No. 710,323

8 Claims. (Cl. 177—341)

This invention relates to selective signalling telephone systems. Its general object is to provide an improved frequency-selective system for signalling, or ringing, called stations on multistation subscriber lines, usually termed party lines, which permits an increase in the number of stations on a line which can be reliably and satisfactorily signalled selectively.

In its simplest aspect, a frequency-selective party-line ringing system employs ringers on any party line which are tuned respectively to preassigned ringing frequencies. Any such ringer must respond effectively to its assigned frequency, but not to the frequency assigned to any other ringer on the line.

One specific object of the invention is to increase the number of selectively distinguishable frequencies which may be assigned, by increasing the effective sharpness of tuning of the ringing apparatus at the several stations on a party line to permit the assignment of ringing frequencies lying closer together in the ringing-current spectrum.

A further specific object is to enable the ringing apparatus at the several stations on a heavily loaded party line to be divided into two groups responsive respectively to ringing current sent over the two conductors of the line, while avoiding return-path attachments which would unbalance the line during conversation.

In attaining the foregoing objects, each station is provided with a low-power, high-impedance starting circuit and with a normally open ringing circuit arranged to be closed depending upon the flow of current in the starting circuit of the ringing frequency assigned to the station.

In the preferred embodiment of the invention, the usual tuned ringer is included in the starting circuit and in the ringing circuit, and closure of the ringing circuit is conveniently accomplished by a contact arrangement controlled by the motion of the tuned vibratory system of the ringer.

In a modified arrangement, a separate tuned starting device is employed, in which case the ringer itself is not necessarily a tuned device.

Other objects and features of the invention will appear as the description progresses.

The accompanying drawings, comprising Figs. 1 to 3, disclose sufficient of the circuits and apparatus included in an embodiment of the invention to enable the invention to be understood.

A. *The ringer*

Figure 2:
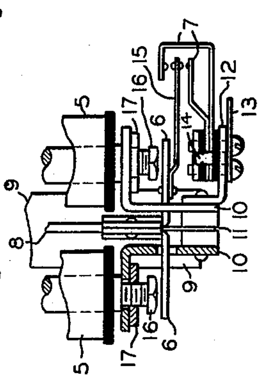
Fig. 2 shows a portion of a tuned ringer having a contact arrangement applied thereto to close the ringing circuit responsive to current flow of the assigned frequency in the starting circuit.

Fig. 2 shows a portion of a tuned ringer of well-known construction to which a set of contacts has been applied to close the normally open ringing circuit responsive to current flow in the low-power high-impedance starting circuit. The tuned ringer of Fig. 2 is generally similar in construction to the untuned ringer shown at Fig. 64, page 82, of Telephone Theory and Practice—Manual Switching and Substation Equipment, by Miller, first edition, McGraw-Hill Book Company, Inc., 1933.

The contact arrangement includes the two stationary contact members 7, and the flexible contact member 15 secured to armature 6 and normally standing midway between members 7. A slight movement of armature 6 in either direction suffices to bring the free end of flexible member 15 into contact with one or another of the fixed members 7.

As shown, members 7 comprise parts electrically in contact with each other and insulatedly supported on yoke 12. One of the members 7 carries a side lug 14 to which a conductor may be conveniently attached, while terminal member 13 is connected with movable member 15 through the frame, reed, and armature of the structure.

The usual permanent magnet is illustrated at 9, the electromagnets at 5. L-shaped non-magnetic brackets 10 are secured to the ends of the cores of the electromagnets to form a fixed support for armature 6, which is made in two pieces to facilitate securing the clapper rod 8 and the free end of suspension spring 11 thereto. Suspension spring 11 is of the usual flat type (seen edgewise in Fig. 2), and is clamped between a pair of spacing blocks by rivets passing through parts 10, 11, and 12.

Brackets 10 are secured to the ends of the cores of electromagnets 5 by lock nuts 17, surrounding the magnetic core-extension screws 16, threaded into the cores. When lock nuts 17 are loosened slightly, the core-extension screws 16 may be turned as desired to increase or decrease the normal working gap between them and the ends of armature 6. By this means, the sensitivity of the ringer is adjusted, being greater for a small separation, and less for a large separation.

B. *The system*

Figure 1:
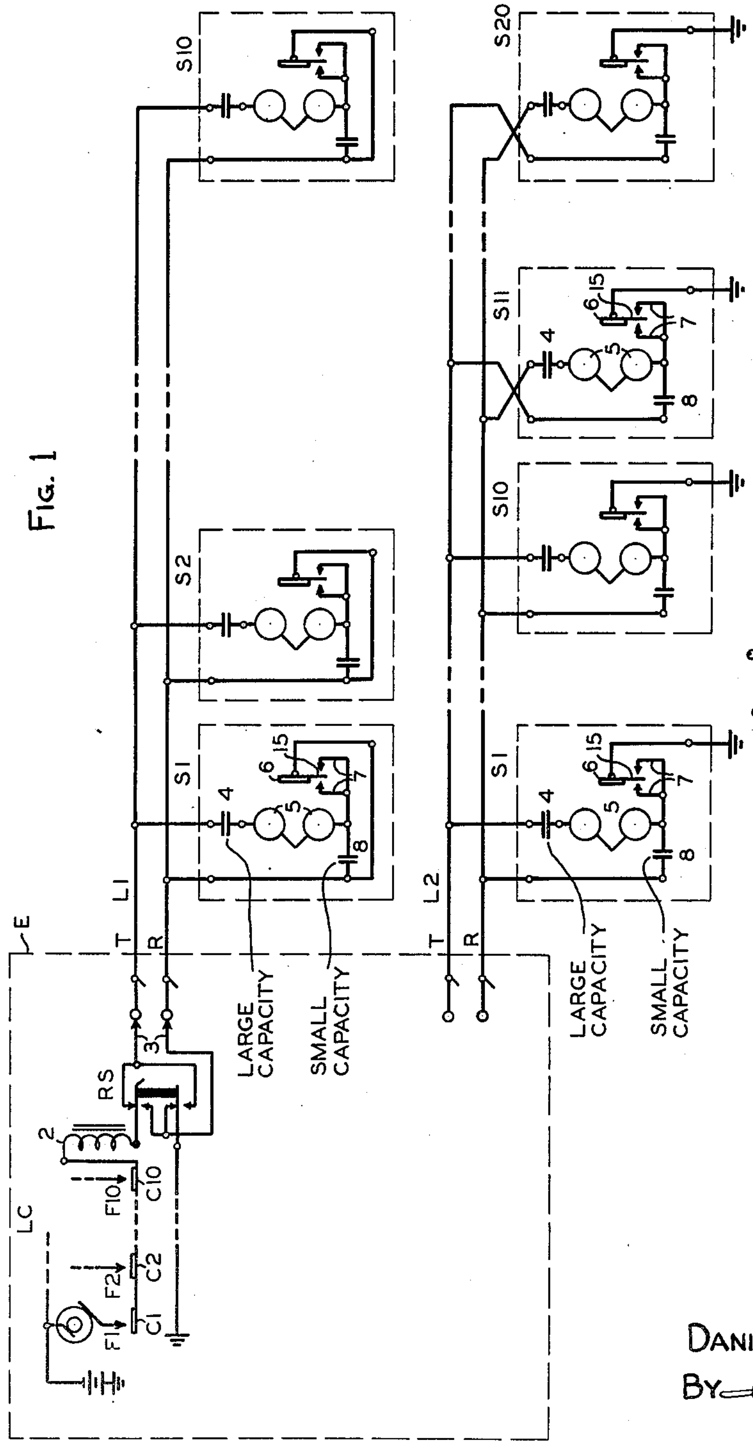
Fig. 1 is a circuit drawing of a portion of the equipment of a telephone exchange, and a pair of lines having stations thereon equipped according to the invention.

Referring now to Fig. 1, L1 and L2 represents respectively a ten-station party line and a twenty-station party line. Each of these lines extends from a central exchange indicated at E. Each line comprises two conductors labeled T and R for identification purposes.

The exchange equipment includes the usual circuit apparatus, commonly termed link circuits, for interconnecting the lines for conversation. One such link circuit is shown fragmentarily at LC. It includes a pair of terminals 3 which may be interconnected as desired with any one of the lines including lines L1 and L2. Only such apparatus is shown in link circuit LC as is employed in signalling the desired station on a called party line. This apparatus includes contact sets C1 to C10 for connecting ringing leads F1 to F10 respectively to conductor T of the called line with which link circuit LC may be currently associated.

Each of the leads F1 to F10 has associated therewith a source of alternating ringing current, such as the generator shown symbolically in connection with lead F1. The exchange battery is ordinarily included in the common return circuit of all such sources, and is so illustrated in connection with link circuit LC.

Device 2 represents the winding of the usual trip relay employed to terminate the application of ringing current automatically upon the removal of the receiver at the called substation. Reversing switch RS, when actuated, causes the ringing current to be applied to conductor R of the called line instead of to the conductor T. The conductor over which ringing current is not applied is grounded in the link circuit LC to provide a return path for the transmitted ringing current.

C. *Ten-party line L1*

The line L1 of Fig. 1 has ten stations, S1 to S10, thereon. The usual talking apparatus at these stations is omitted from the drawings for the sake of simplicity, only the ringing apparatus being shown. The ringing apparatus at each station includes a ringer as shown in Fig. 2. These ringers are tuned to respond respectively to the ten frequencies of ringing current supplied over leads F1 to F10.

By way of example, these ten ringing frequencies may be 16, 18, 21, 25, 30, 36, 42, 50, 58, and 66 cycles respectively.

Referring particularly to station S1 on line L1, the ringing apparatus shown thereat includes the electromagnets 5, armature 6 and attached flexible contact member 15, and opposed stationary contact members 7, of a tuned ringer such as is illustrated in Fig. 2. Condensers 8 and 4 are each connected in series with electromagnets 5 of the ringer, and the series combination is bridged across conductors T and R of the line. Condenser 4 represents the usual relatively high-capacity condenser ordinarily connected in series with the ringer on a common-battery telephone line. Condenser 8, on the other hand, is of a relatively small capacity, whereby it offers a comparatively large impedance to the passage of ringing current therethrough. It will be observed that contact member 15 is arranged to shunt the high-impedance condenser 8 when it engages either of its associated fixed contacts 7, thereby greatly lowering the impedance of the bridged ringer circuit. The circuit including the bridged elements 4, 5, and 8 comprises the high-impedance starting circuit hereinbefore referred to, while the normally open circuit through elements 6, 7, 5 and 4 represents the low-impedance ringing circuit closed under the control of current flow of the preassigned frequency in the high-impedance starting circuit.

When a station on line 1 is being called by way of link circuit LC, terminals 3 of the link circuit are set upon the terminals of the called line as illustrated, and the concerned one of contact members C1 to C10 is closed to transmit ringing current of the concerned frequency over conductor T of the called line L1. The ringing current applied to conductor T finds a return path by way of the bridged high-impedance starting circuit of the ten stations S1 to S10 in parallel to conductor R, and thence to ground at the link circuit LC, through contacts of switch RS. Only a relatively small flow of ringing current occurs initially because of the high impedance of the bridged starting circuits, resulting from the high impedance of the small-capacity starting condensers 8.

If S1 is the station being called (contacts C1 closed to cause ringing current of frequency F1 to be transmitted), the response of the tuned armatures at stations S2 to S10 is negligible because they are tuned to frequencies other than the one being transmitted, and because of the relatively small current flowing in the high-impedance starting circuits.

At the called station S1, the small starting current flowing through elements 4, 5, and 8 in series, being of the frequency to which the ringer is tuned, causes a sufficient response of armature 6 to bring the attached light contact member 15 into engagement with fixed contacts 7 alternately. The engagement between member 15 and either contact member 7 short-circuits condenser 8. This action occurs once during each half cycle of ringing current. During the remainder of such half cycle, a considerably increased current flow occurs by virtue of the fact that the high-impedance condenser 8 is bypassed, through members 15 and 7. Accordingly, the initial slight response of the tuned system of the ringer gives way to a vigorous gong-striking response. With the tuned armature system moving at the amplitude required for the gongs to be struck, the high-impedance condenser 8 is short-circuited most of the time, as the flexible spring member 15 is normally only slightly out of contact with fixed members 7.

When the receiver (not shown) is removed at the called substation, the usual direct-current path (not shown) is closed across conductors T and R of the called line thereby permitting direct current to flow over the ringing circuit because of the inclusion of the exchange battery therein, thereby effectively energizing trip winding 6 to cause the application of ringing current to be terminated in the usual manner.

D. *Twenty-party line L2*

Line L2 is similar to line L1, except that it has twice as many stations thereon, twice as many stations as there are separate frequencies of ringing current. Accordingly, the first ten stations S1 to S10, are associated with conductor T of line L2, the remaining ten stations S11 to S20, are associated with conductor R of the line.

In order to associate any station S1 to S10 specifically with conductor T of line L2, the vibratory element 15 (represented by terminal 13, Fig. 2) is connected to ground at the substation, rather than to conductor R to which it is connected in Fig. 1. The same arrangement is employed at stations S11 to S20, except that conductors T and R of the line are at each such station.

When a station on line L2 is being called by way of the link circuit LC, the terminals 3 of such link circuit are set upon the terminals of line L2 in the manner illustrated for the terminals of line L1; the desired one of the contact sets C1 to C10 is closed according to the ringing frequency assigned to the called substation; and a reversing switch RS is left in its illustrated normal position, or is operated to its alternate position, depending upon whether the called station is in group S1 to S10, signalled over conductor T, or is in group S11 to S20, signalled over conductor R.

If station S1 on line L2 is being called, reversing switch RS is left in its illustrated normal position, as it is for each of the stations S1 to S10, and contact set C1 is closed to cause frequency F1 of ringing current to be transmitted. This frequency of ringing current is accordingly transmitted over conductor T of line L2, conductor R being grounded through link circuit LC by way of contacts of switch RS.

On the called line L2, armature 6 at each of the stations S1 and S11 begins to vibrate sufficiently for member 15 to engage fixed contacts 7. At station S11, however, the engagement between members 15 and 7 serves to apply the full ringing potential to limiting condenser 8, shunting the current away from electromagnets 5 while the contacts 15, 7 are closed, whereby the small starting amplitude of the armature is not increased. At substation S1, however, the contact between parts 15 and 7 shunts the ringing current away limiting condenser 8 by providing a return path to ground for the ringing current reaching electromagnets 5 through condenser 4, thereby causing a vigorous response at this station as explained in connection with station S1 of line L1.

If station S11 on line L2 is being called, contacts C1 are closed as before to cause the desired frequency F1 to be transmitted, but reversing switch RS is moved to its alternate position, as it is for each of the stations S11 to S20. Accordingly, ground potential at link circuit LC is connected to conductor T of line L2, and the selected frequency of ringing current is projected over conductor R. Armatures 6 at stations S1 and S11 start to respond as above noted. In this case, the response at substation S1 causes member 15 to engage contacts 7 to shunt ringing current away from the ringer, whereby the amplitude of response remains feeble. At the called station S11, the closure of member 15 with fixed member 7 completes a low-impedance path to ground for the ringer, connected as it is to conductor R, thereby inducing the desired vigorous response.

E. *Line L3*

Figure 3:
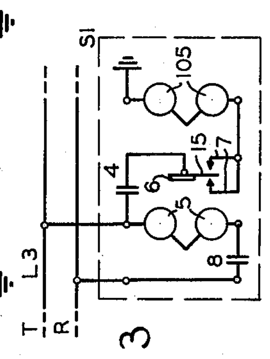
Fig. 3 is a circuit drawing of a modified station arrangement.

Figure 3 shows a modified station arrangement for station S1 of multi-station line L3. In the modified arrangement, separate devices are used in the starting and ringing circuits. Parts 4, 5, 6, 7, 8, and 15 may be similar to the corresponding parts of the stations on lines L1 and L2. Part 105 is a separate ringer, not necessarily tuned.

Applying ringing current to one conductor of line L3, and ground to the other, causes current to flow in the bridged starting circuits at the stations on the line. The starting circuit at station S1 is through limiting condenser 8 and the electromagnets 5. Flow of current in this circuit of the frequency assigned to station S1 causes armature 6 to bring contact member 15 into engagement with contacts 7 alternately. Each such closure completes a ringing circuit, from conductor T of the line to ground by way of condenser 4 and ringer 105. If the ringing current is being applied to conductor T, the ringing circuit is effective to operate ringer 105, but not if the ringing current is being applied to conductor R, with a ground return path over conductor T.

The arrangement of Fig. 3 is illustrated specifically for a so-called divided ringing system of the general type exemplified by line L2, Fig. 1. If so-called bridged ringing, exemplified by line L1, is desired for line L3, the upper terminal of ringer 105 is transferred from ground to conductor T of the line.

One advantage of the arrangement of Fig. 3 is that providing separate starting and ringing devices enables each such device to be specialized for its peculiar function. For example, the device in the starting circuit does not require gongs, nor does the device 105 in the ringing circuit need to be a tuned ringer, and can therefore ordinarily be arranged to provide a louder signal than is obtainable from a tuned ringer.

F. *General explanation*

Partly in explanation of the immediately preceding statement, and partly in explanation of the previously stated fact that the disclosed arrangement permits the use of ringing frequencies lying closer together, the following is offered:

It is well known that the natural period of a tuned ringer changes when the clapper begins to strike the gongs, as the gong stiffness then is added to the stiffness of the suspension spring, and the combined stiffness interact with the mass of the parts to provide a shorter natural period, or higher natural frequency. Therefore, such a ringer must be partly out of tune with the source of current during either the striking period, or during the prestriking period when it is building up toward gong-striking amplitude. This action is discussed somewhat by Miller on page 59 of his previously noted publication. In practice, the design of the ringer windings is such that, with normal ringer adjustment, and with normal ringing voltage applied to the line, the armature-actuating force applied is so strong that the tuned armature-clapper system acquires a gong-striking amplitude at frequencies differing from the intended frequency by as much as about one-eighth of the latter, for which reason the frequencies have been so related that one differs from the next lower one by about one-quarter, or more. Even with this relatively wide frequency separation, so-called cross-ringing difficulty has often been experienced unless the ringers are rendered relatively insensitive, as by a great air-gap adjustment.

In the disclosed improved arrangement, the sensitivity of the ringer once its disclosed ringing circuit is closed may be made as great as desired, and the desired lack of sensitivity to foreign frequencies may still be secured in the starting circuit by selection of a low-enough capacity for the limiting condenser 8 therein.

I claim:

1. In a signalling system, a line having stations thereon corresponding respectively to assigned frequencies of signalling current, each station including an electro-mechanical signalling device mechanically tuned to the assigned station frequency and electrically interconnected with the line through a local impedance device effective to lower its response to the transmission of signalling current over the line, each signalling device requiring at least a given amplitude of movement to impart a signal, and means responsive to a subsignalling amplitude of movement of the signalling device at any station for bypassing the said impedance device local thereto.

2. In a signalling system, a line having stations thereon corresponding respectively to assigned frequencies of signalling current, each station including an electro-mechanical signalling device mechanically tuned to the assigned station frequency and electrically interconnected with the line in a normally closed high-impedance local starting circuit, and in a normally open low-impedance local signalling circuit, each signalling device requiring at least a given amplitude of movement to impart a signal, and means responsive to a sub-signalling amplitude of movement of the signalling device at any station for closing the low-impedance signalling circuit at such station.

3. In a signalling system, a line having stations thereon corresponding respectively to assigned frequencies of signalling current, each station including an electro-mechanical signalling device mechanically tuned to the assigned station frequency and electrically interconnected with the line in a low-power starting circuit, each signal device having a tapper which becomes effective to impart a signal depending upon a certain amplitude of movement being reached by the tuned mechanical portion thereof, and means responsive to a subsignalling amplitude of movement of the signalling device at any station for altering the starting circuit thereat to increase its power sufficiently to compensate for the mechanical de-tuning arising from the signalling operation of the tapper.

4. In a divided-signalling selective signalling system, a two-conductor line having a pair of stations thereon, each station including a signal device bridged across the line in series with an impedance device, means for transmitting signalling current over either conductor of the line, according to which station is to be signalled, from a grounded source of signalling current and for grounding the other conductor, the signal devices at the two stations being adjacent the two conductors respectively, and means at each station responsive to the said transmission of signalling current over either conductor for grounding the junction of the signal and impedance devices in the local bridge across the line.

5. In a divided-signalling selective signalling system, a two-conductor line having a pair of stations thereon, each station including a signal device bridged across the line in series with an impedance device, means for transmitting signalling current over either conductor of the line, according to which station is to be signalled, from a grounded source of signalling current and for grounding the other conductor, the signal devices at the two stations being adjacent the two conductors respectively, and means at each station controlled by the said signalling device thereat responsive to the said transmission of signalling current over either conductor for grounding the junction of the signal and impedance devices in the local bridge across the line.

6. In a signalling system, a line having a station thereon including an electro-mechanical signalling device having a reciprocable tapper system which becomes effective to impart a signal dependent upon its reaching a certain amplitude of movement, said station including a large-capacity condenser and a small-capacity condenser, said signalling device and said condensers being connected in a circuit including the line, said circuit including each said circuit element at the station in series with the other two, and normally open contacts at the station for by-passing said small-capacity condenser, said contacts being closable responsive to an amplitude of movement at the tapper system less than said certain amplitude.

7. In a telephone system, a two-conductor line, a telephone ringer connected in bridge of the conductors of the line, two condensers included in said bridge, each in series with the other and in series with the ringer, and contacts at the ringer closed incidental to its response to ringing current received over the line to by-pass one of the condensers.

8. In a telephone system, a two-conductor line and a telephone ringer connected in bridge of the conductors thereof, a condenser included in said bridge in series with the ringer, and contacts at the ringer closed incidental to its response to ringing current received over the line to by-pass the condenser.

DANIEL B. ROBISON.

REFERENCES CITED

The following references are of record in the file of this patent:

UNITED STATES PATENTS

| Number | Name | Date |
|---|---|---|
| 276,960 | Currier | May 1, 1883 |
| 1,852,045 | Edwards | Apr. 5, 1932 |
| 2,047,900 | Bruckel | July 14, 1936 |
| 2,131,164 | Chauveau | Sept. 27, 1938 |
| 2,391,868 | Angel | Jan. 1, 1946 |
| 2,404,401 | Plensler | July 23, 1946 |